(12) United States Patent
Krivosheev et al.

(10) Patent No.: US 8,701,165 B2
(45) Date of Patent: Apr. 15, 2014

(54) CREDENTIALS PHISHING PREVENTION PROTOCOL

(75) Inventors: Evgeny Krivosheev, Moscow (RU); Ignacio de la Cruz Gallego, Madrid (ES); Maarten Van der Most, Schiphol (NL)

(73) Assignee: Microsoft Corporation, Redmond, WA (US)

( * ) Notice: Subject to any disclaimer, the term of this patent is extended or adjusted under 35 U.S.C. 154(b) by 895 days.

(21) Appl. No.: 12/477,684

(22) Filed: Jun. 3, 2009

(65) Prior Publication Data

US 2010/0313248 A1   Dec. 9, 2010

(51) Int. Cl.
*H04L 29/06* (2006.01)
*G06F 12/14* (2006.01)

(52) U.S. Cl.
USPC .................................. 726/5; 726/23

(58) Field of Classification Search
None
See application file for complete search history.

(56) References Cited

U.S. PATENT DOCUMENTS

| 7,152,244 | B2 * | 12/2006 | Toomey ........................ 726/26 |
| 8,095,967 | B2 * | 1/2012 | Loesch et al. .................... 726/5 |
| 2004/0003287 | A1 * | 1/2004 | Zissimopoulos et al. ..... 713/201 |
| 2005/0172229 | A1 | 8/2005 | Reno |
| 2005/0216582 | A1 * | 9/2005 | Toomey et al. ............... 709/224 |
| 2006/0123464 | A1 | 6/2006 | Goodman |
| 2006/0253446 | A1 * | 11/2006 | Leong et al. ...................... 707/9 |
| 2007/0005984 | A1 | 1/2007 | Florencio |
| 2007/0006305 | A1 * | 1/2007 | Florencio et al. ............... 726/22 |
| 2008/0028444 | A1 * | 1/2008 | Loesch et al. ..................... 726/4 |
| 2008/0104672 | A1 | 5/2008 | Lunde |
| 2008/0141342 | A1 | 6/2008 | Curnyn |

FOREIGN PATENT DOCUMENTS

US   EP1046976 B1   7/2006

OTHER PUBLICATIONS

Microsoft Corporation; "Optimizing Client Security by Using Windows Vista," Apr. 2007, 27 pp.; http://download.microsoft.com/download/1/f/5/1f5f5084-cef2-43ee-a1d7-ea7b07c1c065/VistaSecurity_TWP.doc.
Gajek, Sebastian, et al., "Compartmented Security for Browsers—Or How to Thwart a Phisher with Trusted Computing," 8 pp.; http://www.opentc.net/publications/OTC_CompSecBrowsers.pdf.

* cited by examiner

*Primary Examiner* — Philip Chea
*Assistant Examiner* — Fatoumata Traore
(74) *Attorney, Agent, or Firm* — David Andrews; Bryan Webster; Micky Minhas

(57) ABSTRACT

Verification of web domains that request login credentials is provided to assist a user in identifying fraudulent request or in avoiding transmission of login credentials in response to such requests. Domain information from a login credential is used to select a verification service corresponding to the domain issuing the credential. Based on a trust level provided by the verification service for the requesting domain, corrective actions may be taken to warn the user or prevent transmission of login credentials. Alternatively, verification may be performed on applications residing on a local computer.

20 Claims, 6 Drawing Sheets

CREDENTIALS PHISHING PREVENTION PROTOCOL

BACKGROUND

Schemes to fraudulently acquire another person's credential and password information have become common on the Internet. Such schemes are commonly referred to as "phishing". Phishing schemes can be quite elaborate. In some schemes, a user is diverted from a desired page to a fraudulent page that is plausibly similar in appearance to the desired page. The user may be led to this type of fraudulent page by clicking a link, by incorrectly typing a web address, or by any other mechanism. Other schemes can be based on a user being convinced to visit a fraudulent page based on incorrect information, such as an e-mail purporting to be from a known business. In still other schemes, a user may correctly enter information to visit a desired site, but the user can be re-routed due to a corrupted server. When a user is presented with a login and password prompt, the user often has little or no context with which to evaluate whether the request for a login credential is legitimate. This makes phishing schemes difficult for a user to detect.

SUMMARY

In various embodiments, systems and methods are provided to reduce the likelihood that a user will send login credentials to a malicious or fraudulent web domain. In order to provide a user more context and assistance when a login credential is requested, a verification is performed on the trust level of the domain making the request. The verification is requested by the local computer of the user. The verification service used to perform the verification is determined based on a domain indicated by the login credential, thus allowing the domain that issued the login credential to have input regarding what domains are likely to be trustworthy. Based on the answer from the verification service, the request for login credentials may be allowed to proceed, a warning may be issued to the user about the requesting domain, or the user may be prevented from sending the login credentials if the requesting domain is known to be not trustworthy. Alternatively, these techniques may be used to determine whether a local application that is requesting a login credential is trustworthy.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Figure 1:
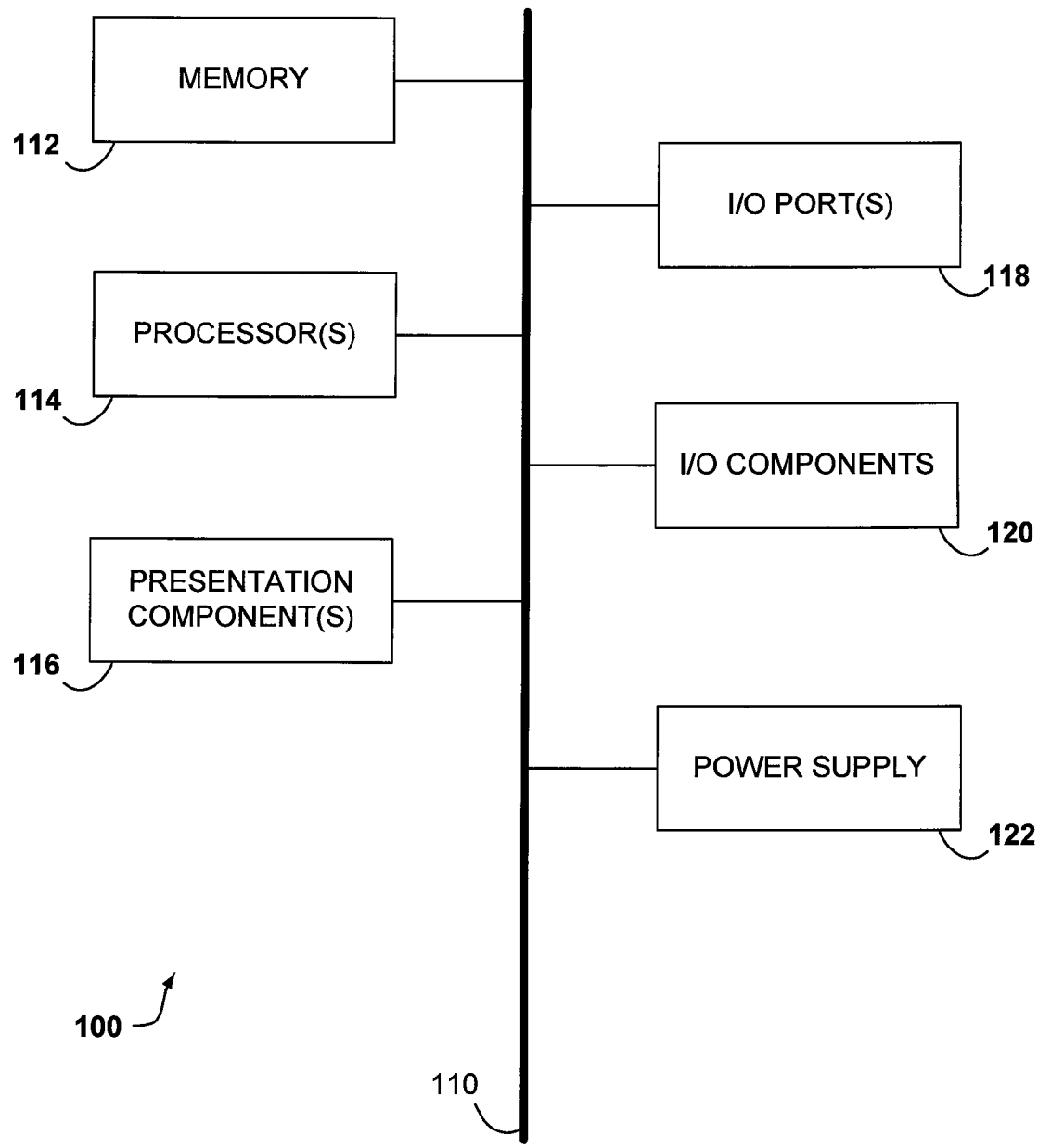
FIG. 1 is a block diagram of an exemplary computing environment suitable for use in implementing embodiments of the invention.

In various embodiments, a system and method are provided for preventing or reducing the likelihood of a user providing credential information to an unauthorized or malicious entity. In an embodiment, a client security service or application is provided on a user's computer. The security service detects situations where a user enters a credential that includes information about a credential domain. For example, a login credential of the form "user@domain.com" or "domain/user" includes a direct indication of the internet or other network domain that originally provided the credential. When a user types in such a credential, the security service determines whether a password has also been requested. If a password has been requested for the login credential, the security service extracts the domain identifier from the login credential and determines the domain of the site requesting the password. The security service then forwards this information to a verification service provided by the domain corresponding to the login credential. Based on the answer provided by the verification service, the security service can take an appropriate action, such as warning the user about the nature of the site requesting the password, entirely blocking the ability of the user to enter information, or allowing the user to proceed.

As the number and variety of desktop, mobile, and other web based applications, services, and sites increase, the number of requests for some type of user credentials is also increasing. Many factors make it difficult for a user to know whether it is appropriate to enter a login credential and corresponding password. In some instances, a login credential issued by one service may now serve as the credential for an increasing number of other sites or applications. In still other cases, a malicious site may pose as the site for a reputable business, in an effort to steal credential information. As a result, it is difficult for users to distinguish valid requests for credentials from requests that should be rejected. It is noted that as computing networks continue to flourish, these same problems may also be encountered in other networks that include domains.

One possible solution to this problem is to maintain a list of trusted and/or untrustworthy sites. Such a list can be stored at a known location, such as a pre-defined remote server. Unfortunately, a trusted list method can severely limit the ability of a user to take full advantage of web resources. For example, if the trusted list is provided by a central authority, then the central authority must be aware of every site that a user may want to visit, and then the central authority must further make judgments about the trust level for each site. Any updates to the trusted list are under the control of the central authority. With the continuing proliferation of sites available via the Internet, it is difficult for a single, central authority to have relevant information about all trusted and/or untrusted sites that may be of interest to a given user.

Alternatively, a user can attempt to build an individual trusted site list, such as by building a "wallet" that contains sites that are authorized to receive credential information. This method has many of the difficulties of the centralized trusted list method. While a local trusted list site and/or wallet can be effective for sites that are repeatedly visited, a user must still make a judgment about each new site visited, likely with little or no additional information. Additionally, the user generated trusted site lists are restrictive, as the user is unlikely to know about new sites associated with an existing credential.

The system and method according to various embodiments of the invention can provide an alternative method for aiding a user in determining whether a credential request is valid. The domain or site that initially issued a login credential provides information about whether another domain should be allowed to have access to the credential. Any information provided by the domain can then be used to assist the user in determining how to proceed. From the user's perspective, the issuer of a credential is in the best position to know which other applications, web sites, or other services should be allowed to receive the credential. From the perspective of an entity issuing credentials, having a domain owner provide information regarding who can use credentials allows the domain owner greater flexibility in modifying web sites. The domain owner can immediately update a credential verification service to reflect changes to the site structure within a domain. This allows faster implementation of new services, as the domain owner does not have to wait for a central trusted list or a plurality of trusted lists to be updated with the new information about authorized sites. Additionally, a domain owner can authorize other web sites outside of the domain to use a credential by allowing the outside site to register with the domain issuing the credential. Again, this allows a credential issuer to provide verification service for even for sites outside of a domain, without concern for when updates will be made to lists beyond the credential issuer's immediate control.

In some embodiments, the system and method can also provide greater flexibility for domains or sites that issue credentials. In particular, the entity issuing a credential can choose to manage the credential in any desired way. The issuer could choose to directly provide a verification service, or the issuer could delegate this action to another service. Because the credential issuer controls the verification service, updates to who should be allowed access to a credential can be made at the issuer's convenience.

In various embodiments, the system and method can also provide additional privacy for a user. Rather than having a blanket list of a trusted sites at a central location for receiving all requests about the trust level of any site, a user only asks a credential issuer about requests related to that credential. Thus, there is not a central authority capable of tracking user behavior based on requests that access a trusted list. Instead, the verification service corresponding to a credential will only know about verification inquiries involving the corresponding credential.

In still other embodiments, a system and method according to the invention can be used for verification of whether an application residing on a user's local computer is authorized to receive credential information. Another type of phishing attack is to install a program on a user's machine, so that the program will run as a local process. The local process can then ask for credential information. Verification can be performed by gathering as much information as possible regarding the local process requesting the credential. This information can then be passed to the credential issuer for verification of whether the local program is authorized to request the credential.

To facilitate the discussion below, reference will be made in various embodiments to domains that are Internet domains; to services that are web-based services; and to the Domain Name System (DNS) for domain name resolution. However, those of skill in the art will recognize that these specific embodiments are described for convenience in understanding the invention. For example, in the embodiments below, reference may be made to Internet domains, web domains, or network domains. Those of skill in the art will understand that the invention can be more generally applied to other types of domains as well, such as local area network domains, wide area network domains such as domains in corporate, government, or educational wide area networks, or any other network domain in a network that can be characterized as having domains. In the embodiments below, reference may be made to web services, such as Internet web services. Those of skill in the art will recognize that the invention can be more generally applied to other types of network services. Suitable types of network services can include an HTTP-web-based service, a special service with its own protocol developed specifically to perform the tasks described below, a service associated with an existing system such as the Domain Name Service, or another type of service that is appropriate to the network the invention is being deployed within. In the embodiments below, reference may be made to the Domain Name System (DNS) for domain name resolution. Those of skill in the art will recognize that any name resolution system which can handle the information described below could be used instead of DNS. Thus, DNS can be used, or another private name resolution system can be used, or any other name resolution system that is operative on the network where this invention is employed.

In various embodiments, the methods according to the invention are implemented by a security client residing on a user computing device. The security client can be a standalone program, a browser plug-in or add-on, a part of the operating system, or any other type of application capable of performing the needed functions.

The security client performs several functions. First, the security client monitors any dialog boxes or other user interfaces with fields for user input. The security clients monitors user input fields for a login credential that includes an indication of an associated domain. When such a login credential is detected, the security client then checks for either a field where a credential password can be entered, or the security client checks for the actual entry of a password. Either before or after detection of the password or password field, the security client also receives the login credential for further processing. In the description below, a password generally refers to a second piece of information associated with a login credential. Thus, a password as used herein can be in the form of a password, a pin, a security code, or any other data string that a user provides that serves the same function as a password.

In various embodiments, the login credential includes an indication of a domain associated with the login credential. One method for indicating an associated domain is a direct indication, such as a login credential having the form "user@domain.com" or "domain/user". Alternatively, the dialog box, web page, or other network entity requesting the credential could prompt a user by asking for the credential associated with a domain. Still other options for indicating a domain that is associated with a login credential will be apparent to those of skill in the art. Yet another option would be to have a domain indication based on a need to retrieve stored data to verify a login credential. For example, a system using fingerprint or retinal scan verification could have a central server that stores the comparison samples for the fingerprint or the retinal scan. In such an embodiment, the domain of the server storing the comparison sample could be identified as an issuing domain. Note that entry of the login credential, the password, or both could be performed automatically by another program or service. References to a user entering a login credential or a password are understood to include this "auto-fill" situation.

Note that the login credential and password should not be transmitted until the security client has received an answer from a verification service regarding the domain requesting the login credential. This can be achieved by the browser software in any convenient manner. For example, the browser can simply hold the entered login credential and password in a cache until the security client approves transmission of the information, possibly based on the user providing additional input to acknowledge risk information. Alternatively, the browser could prevent data entry in the password field until after the security client has verified the requesting domain.

After detecting the combination of a login credential and an associated password field or user entry of such a password, the second role of the security client is to extract the associated domain information from the login credential. In embodiments where the login credential includes a clear indication of the domain, the domain is extracted as included in the credential.

In addition to extracting the domain from the credential, the security client also determines a domain identifier for the domain that is requesting access to the credential. The domain identifier can be the domain name itself, or another text string that indicates the domain. If the domain identifier is a text string related to the domain, the domain identifier can be a text string created by the security client based on available information, such as information from the browser. In an example where the requesting domain is an Internet domain that is accessed with a web browser, the domain name of the site requesting a login credential should be readily available from information available to the browser that is displaying information from a remote web location. The domain requesting the credential may be the same as the domain extracted from the login credential, but often the domains will be different. In some situations, more than one domain may be associated with the credential request. For example, a universal resource locator for a web page may indicate a first domain, but the particular frame or browser instance containing the credential request may be from a second domain, such as a domain specified by a FRAME or IFRAME tag. Preferably, the security client should determine the domain information from the frame or browser instance specifically associated with the display of the credential request. In an alternative embodiment, the security client can identify all domains related to a credential request. In some alternative embodiments, the security client can notify the user of the fact that multiple domains appear to be involved in the credential request. Optionally, the multiple domains can be forwarded to the verification service, for evaluation of the trust of each domain.

After extracting and/or determining the domain that issued a credential, the security client also selects a verification service that will receive the verification inquiry. The security client then forwards an inquiry to the selected verification service. There are various methods for accomplishing this function. In an embodiment, the security client can select a verification service for a domain by retrieving a network address from a stored table. The security client then forwards a message to the network address that includes the domain of the site that issued the request for the login credential and password. Optionally, the message can also include the login credential, or the extracted domain indication from the login credential. In response to the inquiry, the verification service provides the security client with information regarding the trust level of the domain requesting the login credential.

In some alternative embodiments, the security client can also extract the password after entry by the user, and then use the password to aid in selecting an appropriate verification service. Some login credentials may be used for authentication by more than one domain. For example, many e-commerce sites request a valid e-mail address as a login credential. The valid e-mail address will include a domain, but the actual credential authority in this situation is the e-commerce site, which likely has a different domain. In such embodiments where more than one domain uses the same login credential, the security client can optionally also extract the password or at least a portion of the password associated with the login credential. The combination of the login credential and password, or a combination of at least a portion of the login credential and at least a portion of the password, can then be compared with a stored list, to determine the credential issuer for the particular login and password combination. The verification service stored for the login and password combination is then selected to perform the verification, rather than the verification service indicated by the domain included in the login. Optionally, in embodiments where the security client captures portions (including up to all) of the login credential and/or the password for further use, the security client can protect or encrypt the captured values in some manner, such as by hashing. For example, the login credential and password can be hashed separately to provide multiple hash values, or the login credential and password can be combined in some manner, either before or after hashing, to create a single hash value for further use. Other methods of securing the stored data will be apparent to those of skill in the art.

Preferably, the security client selects a verification service and forwards the inquiry without having to rely on a stored list of verification services. Instead, in such embodiments the security client selects the domain associated with the login credential and forwards a message to the name resolution system for the network in an appropriate format. The Domain Name System (DNS) is an example of a name resolution system. In this type of embodiment, the security client can forward the inquiry for verification based only on the domain information extracted from the login credential. Thus, the security client does not have to consult a local or remote list of verification services in order to select a verification service corresponding to a given domain. In the examples below, the DNS system will be specifically referred to for convenience, but any other name resolution service with sufficient capability to perform the tasks described herein could be used instead.

In response to a DNS (or other name resolution system) message query, a verification service can reply with a DNS message answer that contains information regarding the trust level of the domain that asked for the login credential. Alternatively, the DNS message sent by the security client may generate an answer that identifies a network verification service that will provide verification. For example, the answer may identify an Internet web-based service to serve as a verification service. If the security client is operating on another type of network, the network location of a verification service could be identified in a manner appropriate to the network. The security client would then select this identified verification service by transmitting another verification inquiry to the specified network location. In this type of embodiment, the security client can still operate without stored information regarding verification services. However, this type of embodiment provides the further advantage of the flexibility of using a network based service as the verification service, as opposed to the more limited options available in a DNS message. A combination of DNS messages and other network services can also be used. For example, a security client can forward an inquiry for verification to a DNS service. If the domain that requested the credential is trusted, a return DNS message can indicate the trust level. The return message can also indicate a network service that provides information about untrustworthy sites.

In embodiments involving the use of Domain Name System (DNS) messages, the existing format of the DNS system should be sufficient to allow for verification messages. As described in RFC 1034 (Domain Names—Concepts and Facilities), a standard DNS message has sufficient flexibility to allow for queries and answers regarding verification. For example, a QTYPE for "verification" could be defined by a domain that issues credentials. The QCLASS could be defined as Internet, or as another value. A query message could be sent by a security client to the domain that issued the credential. The query message could ask for resource records corresponding to the domain asking for the credential information. An answer message including matching resource records could provide an indication of a trust level, or the resource records could indicate a web service to be consulted for verification.

After receiving information regarding the trust level of a domain that has requested a login credential, the security client can take zero or more corrective actions. If the domain is a trusted domain and/or has a high trust level, the security client may allow the login credential and password to be transmitted without any modification. On the other hand, if the trust level of the domain is low, the security client could perform a corrective action by preventing entry of the password, such as by preventing entry of data into the password field, or by instructing the browser to prevent entry of data into the password field. Alternatively, if the password has already been entered, the security client could prevent transmission of the credential information or instruct the browser to prevent transmission. Still another type of corrective action would be to provide a warning indicator to the user of some type. The warning indicator could be in the form of text, video, sound, or any other type of output reasonably calculated to alert the user to presence of a potential problem. After optionally acknowledging the warning indicator, the user would be allowed to proceed with providing the login credential and password. In the event that no trust level information is provided by the verification authority, the security client can perform any of the above actions, including allowing the transaction to proceed, providing a warning prior to proceeding, or preventing the transaction entirely.

The information regarding trust level can take a variety of forms. One method of providing trust information is to have "trusted" and "untrusted" sites. In such a scheme, trusted sites would be allowed to receive credential information, while untrusted sites would either be blocked, or the user would be provided a warning prior to access. Another option is to provide various trust levels, such as "trusted", "somewhat trusted", "somewhat untrusted", and "untrusted". Yet another option would be to use a continuous scale, such as a numerical score indicating a trust level between a minimum and a maximum value. Under any of these options, the security client can be configured to take appropriate action based on the trust information received.

In various embodiments, the owner of a domain that issues credentials can set up a verification service to provide information about what web sites and/or domains should be allowed to receive a credential. A verification service is a service that can receive an inquiry for verification of a site or domain, and in response provide an answer to a security client. The inquiry for verification can be provided to the verification service as a DNS message, an inquiry to a web or network location, or by any other convenient method for transmitting a network message.

In embodiments where the verification inquiry is in the form of a DNS message (or a message for another type of name resolution system), the domain owner has several options. The domain owner can set up the DNS server for the domain to directly answer the inquiry. Alternatively, the domain owner can have the DNS server provide information about a web location where the verification service is available. A third option is that a domain owner can delegate the DNS inquiry to another domain. In this type of embodiment, the owner of the domain indicated in the login credential may wish to have another entity handle verification. For example, a DNS inquiry for verification to the domain "hotmail.com" might be delegated to the server for the domain "windows.live.com". In the description both before and following, a security client that selects a DNS domain (or a domain in another name resolution system) is also considered to have selected any delegated domain that handles the verification.

In some preferred embodiments, the initial inquiry for verification is provided by a DNS query, and the DNS answer provides a web or network location which will perform the verification service. Such embodiments can offer several advantages. Because the initial verification inquiry is based on DNS query, the security client making the verification inquiry does not need to have any stored information. Instead, the security client simply sends a query message to the name server of the domain associated with the login credential. However, DNS messages are limited in format. Additionally, if a system participating in the DNS network was corrupted by a malicious program, a faulty DNS answer could be provided. In another embodiment, the DNS or other domain name resolution service can provide an answer that identifies a network service. The identified network service can then provide the verification. A check of the authenticity of the network service can be performed by the security client using any convenient cryptographic method associated with the network service. For example, if public/private key encryption is available, a check of authenticity can be performed by accessing a security certificate associated with the network service. A portion of the security certificate can be encrypted using a known public/private key associated with the domain that issued the credential. This encrypted portion can then be checked by the security client to provide further confidence that the proper verification service is being used.

Regardless of whether the verification service is implemented as a DNS service or as a network service, the verification service will have several characteristics. First, the verification service will be able to understand how to interpret an inquiry for verification from a security client. The inquiry for verification will potentially include both the domain corresponding to the login credential and a domain for the entity requesting the login credential. The verification service can distinguish between these domains. Often, this will be trivial, as the domain corresponding to the login credential will be the same as the domain of the verification service. However, a verification service that handles inquiries for more than one domain may need to have the domain of the login credential explicitly identified. In embodiments where both domains are included in a verification inquiry, the verification service can distinguish between the domains based on the order in which the domains appear in the inquiry; based on the inclusion of the full login credential in the inquiry; or based on some other predetermined format for the inquiry.

After receiving the domain information, the verification service determines whether information is available regarding whether the domain requesting a credential should be allowed to receive the credential. Such information can be stored in any convenient manner. For example, the verification service can include a database containing lists of trusted sites and blocked sites, or the verification service can maintain a list including a trust score for known sites. Other information could be maintained in the database as well, such as a sum of the number of times a particular domain has been verified. If a verification service handles verification for login credentials associated with more than one domain, separate lists can be maintained for each domain.

After identifying any information, the verification service provides an answer or reply message to the security client. The reply message can include any of the stored information about the domain requesting the login credential. Alternatively, the message can indicate that no information was available regarding the domain requesting the credential.

Optionally, when a login credential is issued, the domain issuing the credential can provide additional information to the security client. This additional information can be used by the security client to confirm that a selected network based verification service is the appropriate verification service for a credential. For example, the domain could identify a public key corresponding to a public/private key pair. When a verification service performs a verification, a part of the answer message can include an agreed data string signed using the private key. The security client could confirm that the selected verification service is the appropriate service by decoding the agreed data string using the public key. Note that this embodiment still does not require the security client to know ahead of time the identity of the verification service. Instead, the security client only needs to know the correct public key. This allows a domain issuing a credential to retain the flexibility of designating any convenient site, including a third party site, as the web location for the verification service. The security client also does not need to know the identity of the domain requesting the credential ahead of time. Thus, embodiments where the security client uses a public/private encryption scheme to confirm the identity of the verification service retain the advantages described above relative to either remote-based or local-based trusted list and wallet methods.

The above systems and methods provide for verification by accessing a verification service over a network, such as the Internet. However, a verification service may be occasionally unavailable. In such embodiments, an optional alternative verification can be provided if the issuer of the login credential provides some additional information to both the security client and the domain requesting the login credential. For example, a web location that needs login credential information can include an attribute or tag on the web page such as a Verification attribute. The Verification attribute or Verification tag can be associated with any tags on the page that are appropriate, such as BODY, FORM, INPUT type=text, or INPUT type=password. The Verification attribute or tag can include an indication of the domain name for the domain requesting the login credential, and a trust validity date and time. The information in the Verification attribute or tag can be in any convenient format. For example, one possible format for the date and time can be the format indicated in RFC 1123, such as "Mon, 16 Jun. 2008 22:15:30 GMT". These two items are signed by the domain that issued the login credential, such as by using the private key of a private/public key pair for the domain. The security client can then use the other part of the private/public key to verify that the domain requesting a login credential has an appropriate certificate signed by the domain that issued the credential.

For the indication of the domain requesting the credential, the Verification attribute or tag can include a specific domain, or the Verification attribute or tag can have a more general domain description that allows the same Verification attribute to be used for more than one site within a domain. In one possible scheme for the Verification attribute or tag, a listing of the domain name as "site.com" would indicate that only the site.com domain was verified, and not any sub-domains. A listing of the domain as ".site.com" would also verify one level of subdomains, such as www.site.com and ftp.site.com. A listing of the domain as "*.site.com" would verify site.com and all possible subdomains. To recite specific and/or unrelated subdomains, a list of domain names could be provided with separators, such as a space or colon. An example would be "www.site.com ftp.site.com" or "www.site.com:ftp.site.com".

In yet another embodiment, the systems and methods described above can be used to verify whether a local application should be allowed to receive a login credential. A variation of phishing would be to provide a program that could be downloaded or other installed on a user's local computer or other device. The program may appear to perform a useful function, thus encouraging a user to download, install, or launch the program. Such a program, however, could include malicious code that at some point prompts a user to enter a login credential and password. This prompt would originate from the user's local device, and therefore might appear to be more trustworthy than a prompt from a remote site.

The security client could also verify a request for a login credential by a local application. In this situation, the appropriate "domain" for the local application would have to be determined from other information. Possible data fields that could be used to determine a "domain" for the local application include the name of the application, the name of the executable, or the site the application was originally downloaded from. Other fields that could be useful for determining a "domain" will be dependent on the nature of the application, and would be apparent to those of skill in the art. The determined domain information could be sent to the verification service, along with an indication that an application was being verified, rather than a web location.

Several possible examples are provided below to further illustrate how some embodiments of the invention can work. In all of these examples, arbitrary domain names have been selected simply to provide examples. Any overlap with actual web domains is unintentional. In one example, a user with a security client accesses a web site "subdomain.firstdomain.com". While using the web site, the web site provides user entry fields for a login credential and password. The login credential field is auto-filled with the login credential "user@firstdomain.com". The security client detects the entry of the login credential via an interface with the browser. The security client also detects that a password has been requested. The security client sends a DNS query message to the domain server for firstdomain.com indicating that a login credential associated with "firstdomain.com" has been requested by "subdomain.firstdomain.com". The security client receives a DNS answer message indicating that "subdomain.firstdomain.com" is a trusted site. The security client takes no further action, and allows the login credential and associated password to be transmitted.

The user then visits a site "anotherdomain.com". The site requests a login credential. The user enters the login credential "user@randomdomain.com." The security client detects that a password field is available. The security client transmits a DNS query message to "randomdomain.com" for verification of "anotherdomain.com". The security client receives a DNS answer message indicating that the web address "verify.randomdomain.com" should be used for verification. The security client selects this new verification site by sending a HTTP based inquiry to "verify.randomdomain.com". The security client receives a return message indicating that "anotherdomain.com" is untrusted as a known malicious site. The security client disables the fields for the login credential and password and prevents transmission of the login credential to "anotherdomain.com". A message is also displayed to the user to indicate that "anotherdomain.com" failed the verification check, and that credentials associated with "randomdomain.com" should not be sent to that site.

The user then visits a third site "yetanotherdomain.com". In response to a request, the user enters a credential "user@extradomain.com". A DNS query message is sent to "extradomain.com" for verification. The server for "extradomain.com" delegates this message to the server for domain "extra.extradomain.com". A DNS answer message is received from "extra.extradomain.com" that includes two types of information. The DNS answer message indicates that "yetanotherdomain.com" did not match any entry on a trusted list. A web address of "verify.unrelated.com" is provided to determine if there is a match on the untrusted list. The security client forwards an inquiry via http based message to "verify.unrelated.com" and receives an answer that there is also no match on the untrusted list. Based on the answers, the security client opens a separate dialog box on the user display indicating that no information was available for "yetanotherdomain.com". The box warns the user of the increased risk for an unknown domain. The user is provided send and stop buttons and asked to indicate whether the login credential should be transmitted.

In another example, a user having a different embodiment of a security client visits "sampledomain.com". The user is prompted for a login credential and a password. The user enters the login credential "user2@issuingdomain.com." The security client detects the entry of the login credential, and also detects the entry of an associated password. The security client extracts the full login credential and the first four characters of the password. These are combined into one character string and hashed. The hash value is compared with a stored list of hash values. The hash value matches a value from the stored list, which is associated with web address "verify.sampledomain.com". Based on the stored list, "sampledomain.com" is selected as the verification site. A verification inquiry is sent to "verify.sampledomain.com", and a message is received that "sampledomain.com" should be trusted. The security client allows the login credential and associated password to be transmitted.

Having briefly described an overview of various embodiments of the invention, an exemplary operating environment suitable for performing the invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, carrier wave, or any other medium that can be used to encode desired information and which can be accessed by the computing device 100. In another embodiment, computer storage media includes tangible computer readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
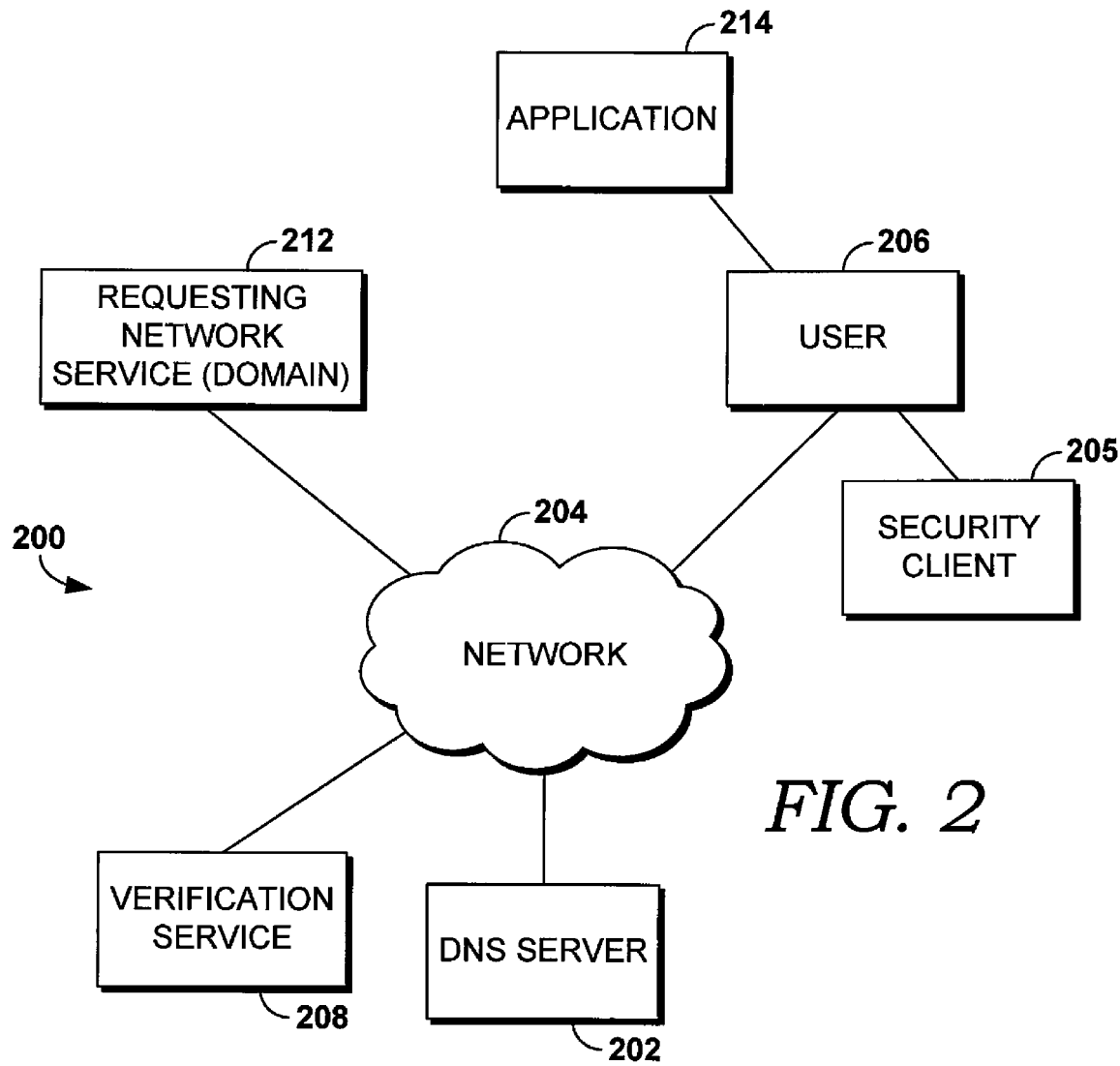
FIG. 2 is a block diagram of an exemplary computing system suitable for use in implementing embodiments of the invention.

Embodiments of the present invention relate to systems and methods for sharing search history information between searchers to facilitate collaboration. Turning now to FIG. 2, a block diagram is illustrated, in accordance with an embodiment of the present invention, showing an exemplary computing system 200 configured to verify a web domain or local application that is requesting login credential information. It will be understood and appreciated by those of ordinary skill in the art that the computing system 200 shown in FIG. 2 is merely an example of one suitable computing system environment and is not intended to suggest any limitation as to the scope of use or functionality of embodiments of the present invention. Neither should the computing system 200 be interpreted as having any dependency or requirement related to any single component or combination of components illustrated therein. Further, the computing system 200 may be provided as a stand-alone product, as part of a software development environment, or any combination thereof.

The computing system 200 includes a user device 206, a security client 205 located on user device 206, a name resolution server such as a DNS server 202, and a verification service 208, all in communication with one another via a network 204 and/or via location on a common device. Also shown are a network service from a domain that is requesting a login credential 212 and an application 214 located on user device 206 that is requesting a login credential. These latter two elements are optional depending on the embodiment. Note that verification service 208 is shown as a separate, network based service in FIG. 2. However, in some embodiments verification service 208 can be integrated with and/or make use of the services of DNS server 202. The network may include, without limitation, one or more local area networks (LANs) and/or wide area networks (WANs). Such networking environments are commonplace in offices, enterprise-wide computer networks, intranets and the Internet. Accordingly, the network 204 is not further described herein.

Each of the user device 206, DNS server 202, requesting web service 212, and verification service 208 shown in FIG. 2 may be any type of computing device, such as, for example, computing device 200 described above with reference to FIG. 2. By way of example only and not limitation, each of the user device 206, DNS server 202, requesting network service 212, and verification service 208 may be a personal computer, desktop computer, laptop computer, handheld device, mobile handset, consumer electronic device, and the like. Additionally, the user device 206 may further include a keyboard, keypad, stylus, joystick, and any other input-initiating component that allows a user to provide wired or wireless data to the network 204, e.g., verification inquires, web page addresses, and the like. It should be noted, however, that the present invention is not limited to implementation on such computing devices, but may be implemented on any of a variety of different types of computing devices within the scope of embodiments hereof.

The security client 205 is configured to detect and receive login credentials that are input to user device 206 and further detect whether a password associated with the credentials has also been input, or whether the user is being prompted to enter such a password based on an appropriate field being provided. The security client 205 also determines information related to the domain of the network service 212 that is requesting login credential information. Alternatively, the security client 205 determines domain related information for application 214. Based on this information, security client 205 transmits a verification inquiry to a suitable recipient, such as DNS server 202 or network based verification service 208. Based on the answer received from the DNS server or network based verification service, the security client 205 allows the login credential information to be transmitted, prevents the transmission or entry of the information, or warns the user regarding the answer.

Figure 3:
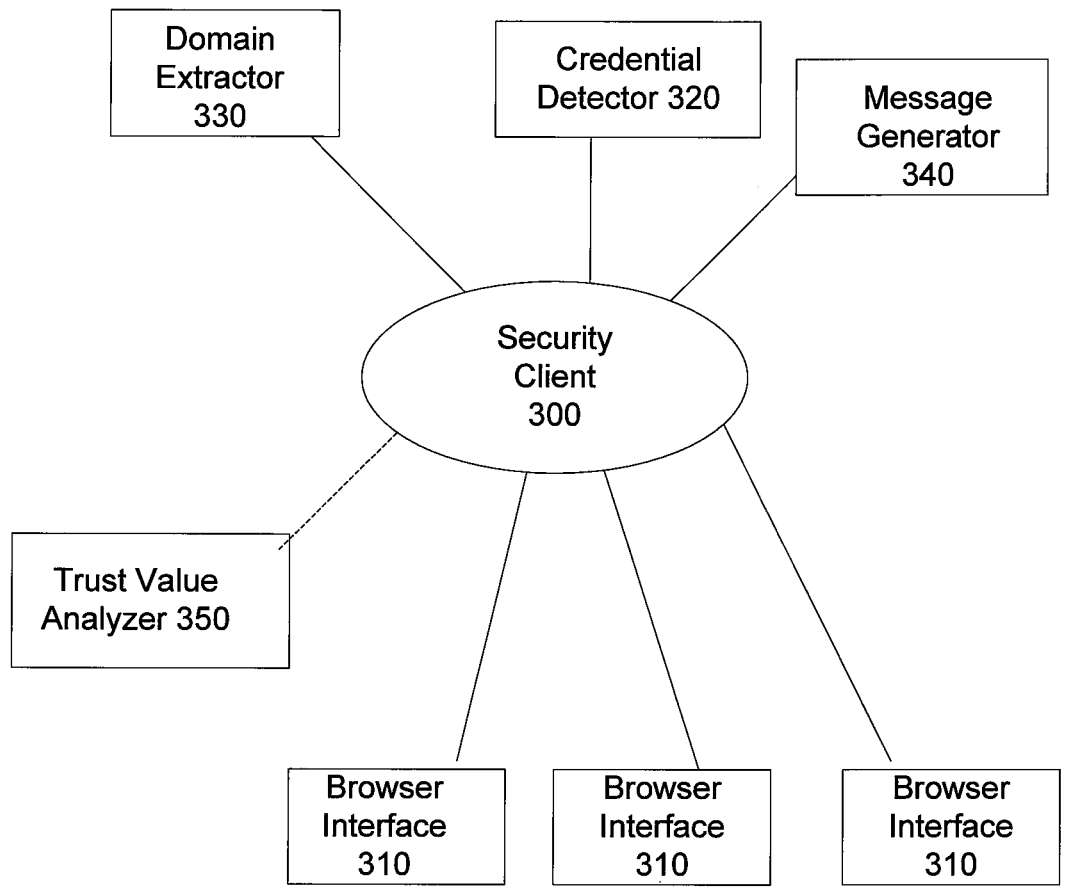
FIG. 3 schematically shows various components in an embodiment of a security client.

FIG. 3 schematically shows an example of a security client suitable for performing various embodiments of the invention. The example in FIG. 3 is directed to embodiments where a web service from a remote domain needs to be verified. In FIG. 3, security client 300 is depicted as a central hub, with components, functions, and/or services of the security client shown on various spokes. Those of skill in the art will recognize that each of the components, functions, and or services within the security client may potentially interact with any other part, depending on the implementation of the search service. Thus, FIG. 3 is meant to schematically represent the various parts that work together, as opposed to implying a specific functional relationship.

In FIG. 3, security client 300 can include one or more browser interfaces 310. The security client creates a browser interface 310 for each instance of a web browser that is generated. Note that although browser interfaces 310 are shown in FIG. 3, those of skill in the art will understand that the browser interface is an example of an application for facilitating communication with a network. In other embodiments, the security client 300 can include such other facilitating applications in addition to and/or in place of browser interfaces 310. Via the browser interface 310, the credential detector 320 monitors data input by a user for data that has the format of a login credential with an indication of an associated domain. Note that data input by a user includes data that is auto-filled into a user entry field. When a login credential is detected, the credential detector 320 further checks for a field corresponding to a password entry field. Alternatively, the credential detector 320 can check for the entry of a password into the password field. Based on these detections, the domain extractor 330 determines a domain for the web site that is requesting the login credential and creates a domain identifier based on that domain. The domain extractor 330 also extracts domain information from the login credential, and optionally captures a portion of the login credential, a portion of the password, or both. These captured portions can preferably be hashed by the domain extractor, so that the hash values can be used in further processing, rather than the actual credential and/or password. Based on the domain information, message generator 340 generates a verification inquiry for the requesting domain. Message generator 340 can send the verification inquiry to a web service indicated in optional verification site list 345. Preferably, message generator 340 sends a message to a DNS server based on the domain information extracted from the login credential. This will generate an answer that is analyzed by trust value analyzer 350. In some situations, the answer will include a reference to a web service that will provide verification. In such situations, message generator 340 will send another message to the indicated web service. When an answer is received that provide trust value information, the trust value analyzer 350 will use the information to determine what corrective actions, if any, should be implemented. The results from trust value analyzer 350 are communicated via a browser interface 310 for appropriate action by the browser interface that contains the credential request.

Figure 4:
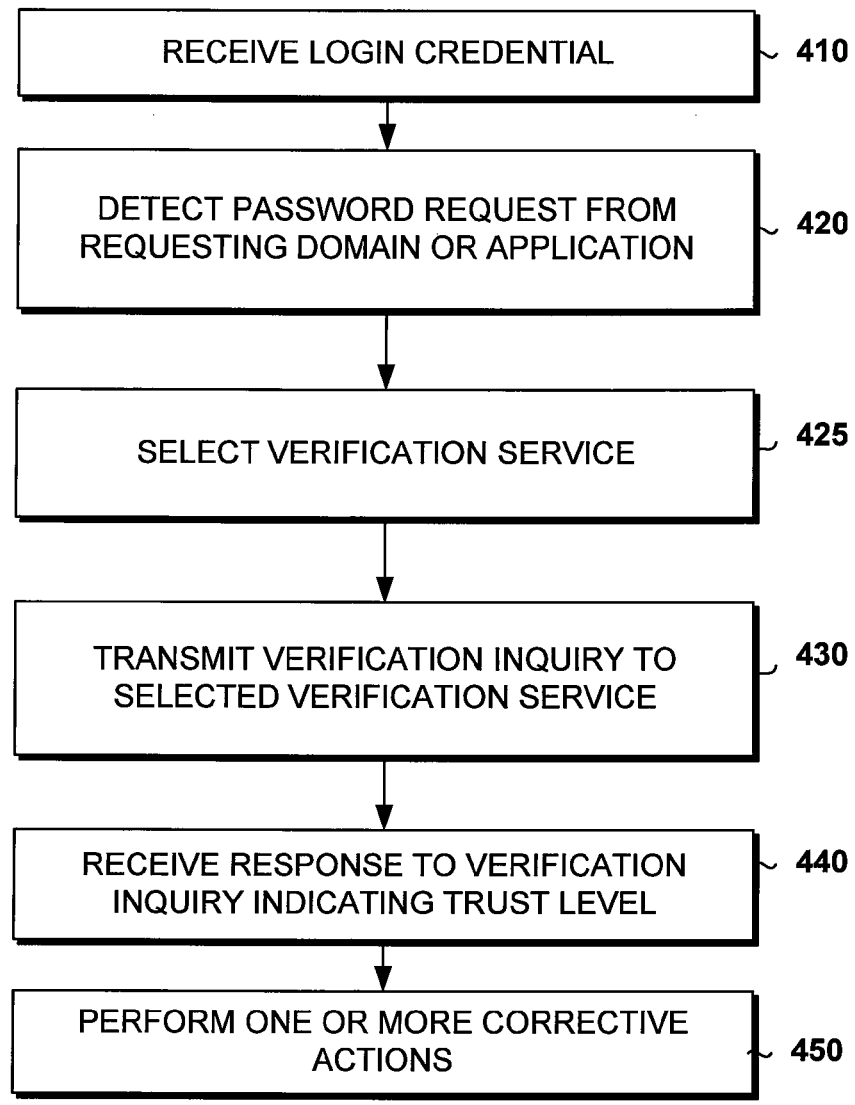
FIG. 4 shows a flow diagram for a sample method according to an embodiment of the invention.

FIG. 4 shows a flow chart for a possible example of the operation of an embodiment of the invention. In this example, the trust level returned by the verification service will require one or more corrective actions by a security client. In FIG. 4, the method begins when a login credential is received 410.

The login credential can be received based on a request issued by a network site at a remote domain, or based on a request by an application on the local computer. A request for a password from the requesting web domain or application is also detected 420. The detection of the password request can occur before or after receipt of the login credential 410. In FIG. 4, detection is shown as occurring after receipt of the login credential 410, but these figures should not be understood as implying any particular order of operations unless explicitly required by the accompanying description. The verification service is selected 425 based on the domain information from the login credential. The verification service can be selected based on any of the methods described above, such as by using the domain identified in the login credential, by using a stored table, by selecting a web site provided in a reply to a DNS query message, or by any other convenient method. A verification inquiry is then sent 430 to the verification service. In response to the verification inquiry, an answer is received 440 that indicates a trust level. Based on the trust level information, one or more corrective actions can be performed 450.

Figure 5:
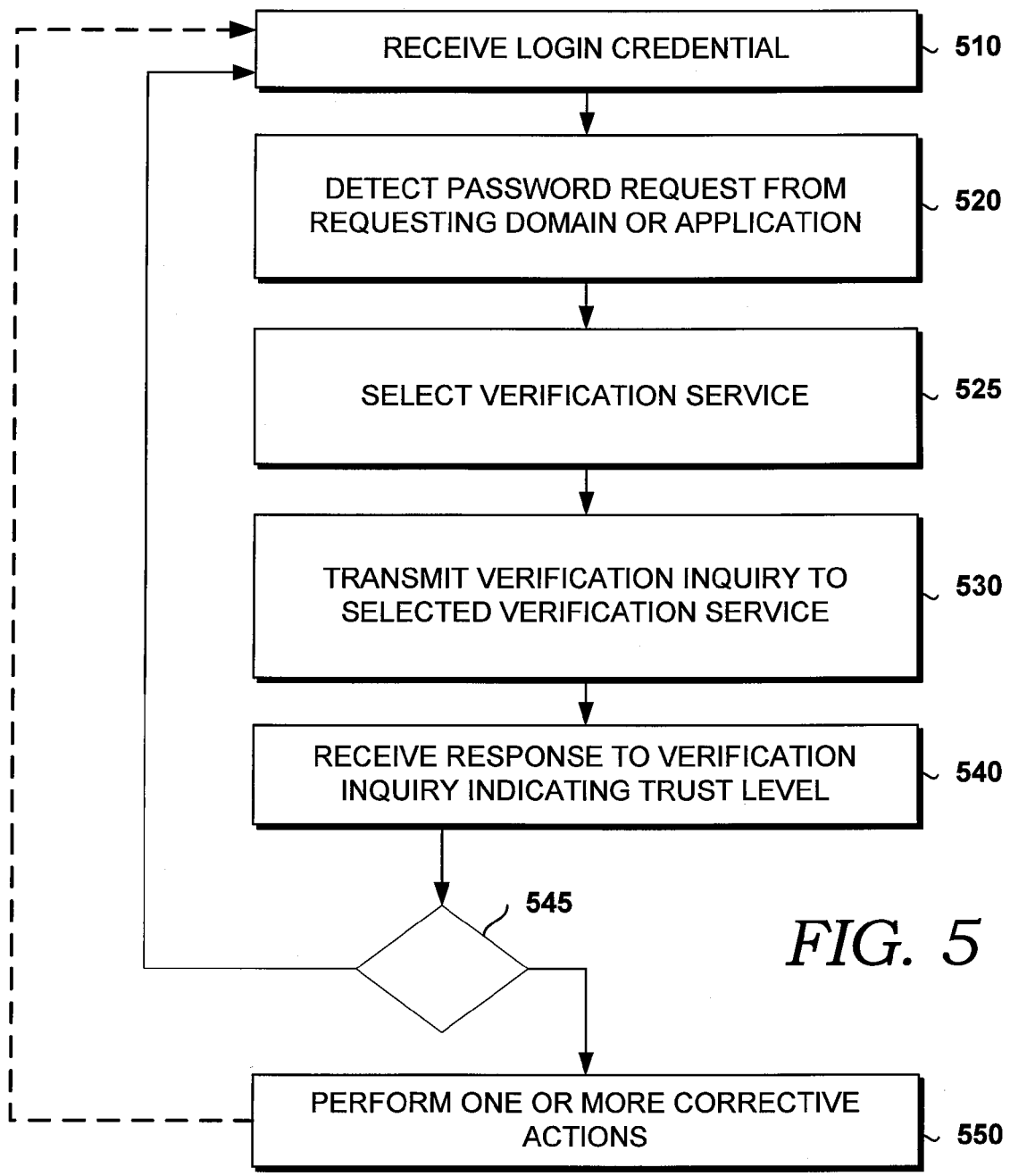
FIG. 5 shows a flow diagram for a sample method according to an embodiment of the invention.

The nature of the various embodiments of the invention also means that the systems and methods described herein are likely to be used repeatedly. FIG. 5 provides a flow chart that demonstrates how a method according to an embodiment of the invention may be repeatedly used to perform verifications for a variety of login credentials, associated password, requesting domains, and verifications services. In FIG. 5, the method begins when a login credential is received 510. The login credential can be received based on a request issued by a web site at a remote domain, or based on a request by an application on the local computer. The request for a password from the requesting network domain or application is also detected 520. The detection of the password request can occur before or after receipt of the login credential 510. The verification service is selected 525 based on the domain information from the login credential. A verification inquiry is then sent 530 to the verification service. In response to the verification inquiry, an answer is received 540 that indicates a trust level. Based on the trust level information, no action may be required, as indicated at decision point 545. When the trust level information indicates that a domain is not sufficiently trustworthy, one or more corrective actions can be performed 550.

Each iteration through a method according to an embodiment of the invention may have differences in one or more of the login credential, the password, the requesting domain, and the verification service. Those of skill in the art will recognize that in many uses of this invention, a favorable trust level will be indicated by the verification service, leading to no corrective action. This is indicated by the dotted line showing the return to the top of the flow chart when no corrective action is needed. Of course, the invention will continue to operate even after a corrective action is implemented, as shown by the dotted line from performance of corrective action 550 back to the beginning of the invention. While it is likely that many uses of the invention will result in no corrective action being required, embodiments where a corrective action is performed during each iteration of the flow in FIG. 4 or FIG. 5 are also included within the scope of the invention.

Figure 6:
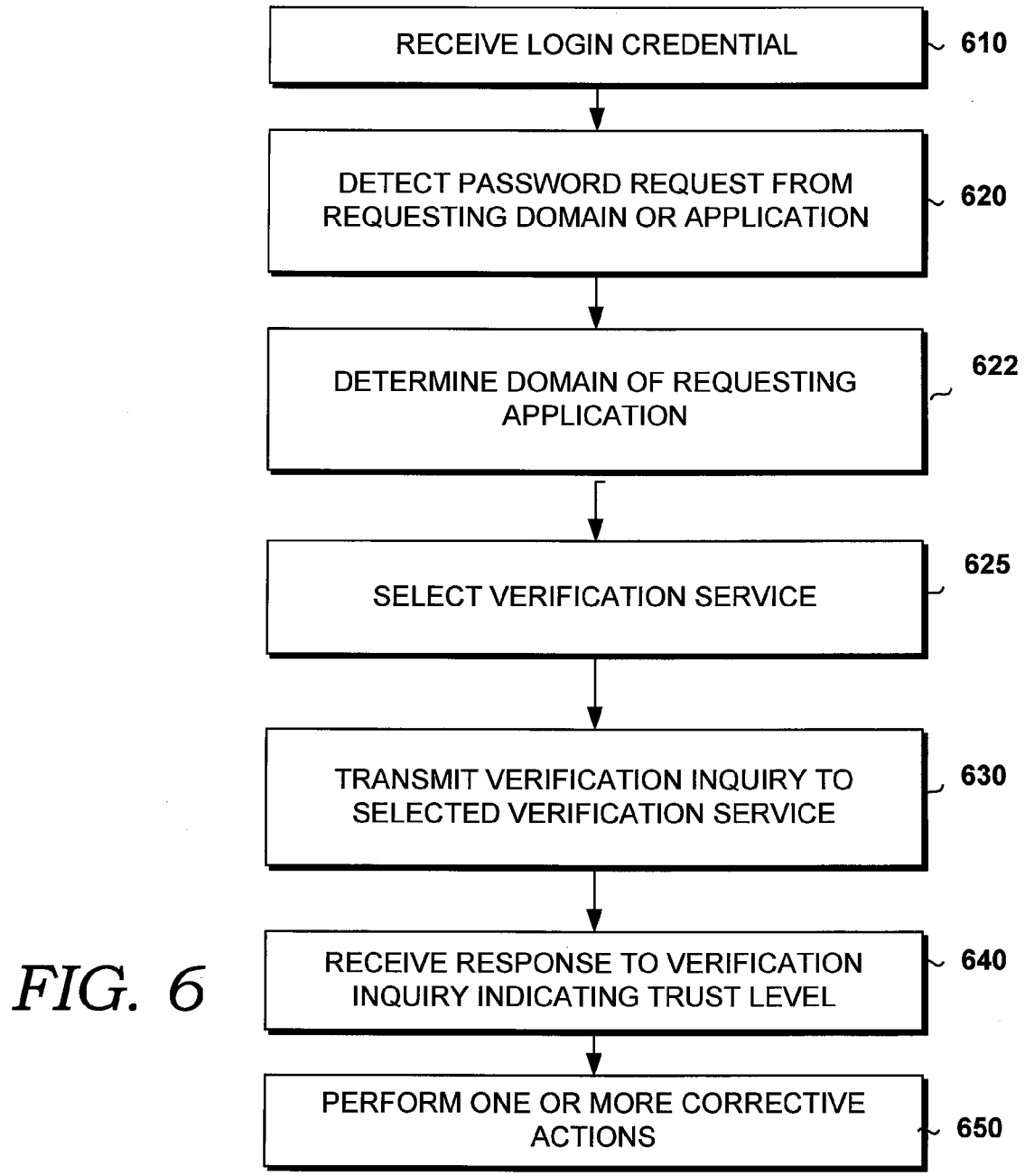
FIG. 6 shows a flow diagram for a sample method according to an embodiment of the invention.

FIG. 6 shows a flow chart for a possible example of the operation of an embodiment where an application is verified. Because this example is specifically directed to an embodiment where a local application has requested a login credential, the determination of the domain associated with the application is included. In FIG. 6, the method begins when a login credential is received 610 from a local instance of an application. A request for a password from the requesting application is also detected 620. Information regarding the application is gathered by the security client to determine 622 a domain associated with the application. A verification service is selected 625 based on the domain information from the login credential. The verification service can be selected based on any of the methods described above, such as by using the domain identified in the login credential, by using a stored table, by selecting a web site provided in a reply to a DNS query message, or by any other convenient method. A verification inquiry is then sent 630 to the verification service. In response to the verification inquiry, an answer is received 640 that indicates a trust level. Based on the trust level information, one or more corrective actions can be performed 650.

Additional Embodiments

In an embodiment, one or more computer-storage media storing computer-useable instructions that, when executed by a computing device, perform a method for verifying a domain that is requesting a login credential are provided. The computer storage media include instructions for performing a method where a login credential is received that includes an indication of an associated domain. A password request is detected from a requesting domain for a password associated with the login credential. A verification inquiry is transmitted to a verification service, the verification service being selected based on the associated domain, the verification inquiry including a domain identifier for the requesting domain. A response to the verification inquiry is received indicating a trust level for the requesting domain. At least one corrective action is performed based on the received response.

In another embodiment, a computer-based method for verifying a domain that is requesting a login credential is provided. According to the method, a first login credential is received that includes an identification of an associated domain. A password request is received from a first requesting domain for a password associated with the first login credential. A verification inquiry is transmitted to a verification service, the verification service being selected based on the domain associated with the first login credential, the verification inquiry including a domain identifier for the requesting domain. A response to the verification inquiry is received indicating a trust level for the first requesting domain. A second login credential is received that includes an identification of a second associated domain. A password request is detected from a second requesting domain for a password associated with the second login credential. A verification inquiry is transmitted to a second verification service that is different from the first verification service, the second verification service being selected based on the domain associated with the second login credential, the verification inquiry including a second domain identifier for the second requesting domain. A response to the verification inquiry is received indicating a trust level for the second requesting domain. At least one corrective action is performed based on at least one of the received responses.

In still another embodiment, one or more computer-storage media storing computer-useable instructions that, when executed by a computing device, perform a method for verifying an application that is requesting a login credential are provided. The computer storage media include instructions for performing a method where a login credential is received that includes an identification of an associated domain from a local instance of an application. A password request is detected from the local instance of the application for a password associated with the login credential. Domain information is determined corresponding to the application. A verification inquiry is transmitted to a verification service, the verification service being selected based on the associated domain, the verification inquiry including a domain identifier for the determined domain. A response to the verification inquiry is received indicating a trust level for the application. At least one corrective action is performed based on the received response.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A computer-based method for verifying a domain that is requesting a login credential, comprising:
   receiving a login credential that includes an indication of an associated domain;
   detecting a password request from a requesting domain for a password associated with the login credential, the requesting domain being different from the associated domain;
   transmitting a verification inquiry to a verification service, the verification service being selected based on the associated domain, the verification inquiry including a domain identifier for the requesting domain, the transmitting of the verification inquiry to the verification service being performed prior to transmitting the password associated with the login credential to the requesting domain;
   receiving a response to the verification inquiry indicating a trust level for the requesting domain;
   performing at least one corrective action based on the received response; and
   transmitting the login credential to the requesting domain.

2. The computer-based method according to claim 1, wherein transmitting a verification inquiry comprises:
   selecting the domain associated with the login credential;
   transmitting a message using a name resolution system to the selected domain;
   receiving an answer corresponding to a network based verification site;
   transmitting the verification inquiry to the network based verification site.

3. The computer-based method according to claim 1, wherein transmitting a verification inquiry to a verification service comprises:
   receiving the password associated with the login credential;
   selecting a verification service from a stored list based on at least one of the login credential and the password;
   transmitting the verification inquiry to the selected verification service.

4. The computer-based method according to claim 1, wherein transmitting the verification inquiry comprises transmitting a request to a network based verification service.

5. The computer-based method according to claim 1, wherein detecting a password request comprises detecting entry of a character string corresponding to a password.

6. The computer-based method according to claim 1, wherein detecting a password request comprises detecting a field for entry of a character string corresponding to a password.

7. The computer-based method according to claim 1, wherein performing a corrective action comprises:
   providing a warning indicator regarding the requesting domain; and
   receiving a user input acknowledging the warning indicator.

8. The computer-based method according to claim 1, further comprising generating a domain identifier for the requesting domain prior to transmitting the verification inquiry to the verification service.

9. The computer-based method according to claim 8, wherein generating a domain identifier comprises determining a domain from a web page based on a characteristic different from the universal resource locator for the web page.

10. The computer-based method according to claim 1, wherein receiving a response to the verification inquiry comprises receiving a DNS message from a delegated DNS domain.

11. A computer-based method for verifying a domain that is requesting a login credential, comprising:
   receiving a first login credential that includes an identification of an associated domain;
   detecting a password request from a first requesting domain for a password associated with the first login credential;
   transmitting a verification inquiry to a verification service, the verification service being selected based on the domain associated with the first login credential, the verification inquiry including a domain identifier for the requesting domain, the transmitting of the verification inquiry to the verification service being performed prior to transmitting the password associated with the first login credential to the requesting domain;
   receiving a response to the verification inquiry indicating a trust level for the first requesting domain;
   receiving a second login credential that includes an identification of a second associated domain;
   detecting a password request from a second requesting domain for a password associated with the second login credential;
   transmitting a verification inquiry to a second verification service that is different from the first verification service, the second verification service being selected based on the domain associated with the second login credential, the verification inquiry including a second domain identifier for the second requesting domain, the transmitting of the verification inquiry to the second verification service being performed prior to transmitting the password associated with the login credential to the second requesting domain;
   receiving a response to the verification inquiry indicating a trust level for the second requesting domain;
   performing at least one corrective action based on the response to the verification inquiry for the second requesting domain; and
   transmitting the first login credential and the password associated with the first login credential to the first requesting domain.

12. The computer-based method according to claim 11, wherein performing a corrective action comprises preventing transmission to second requesting domain of at least one of the second login credential and the password associated with the second login credential.

13. The computer-based method according to claim 11, wherein the domain associated with the first login credential is the same as the domain associated with the second login credential, and the password associated with the first login credential is different from the password associated with the second login credential.

14. The computer-based method according to claim 13, wherein transmitting a verification inquiry to a verification service comprises:
receiving the password associated with the login credential;
selecting a verification service from a stored list based on at least one of the login credential and the password;
transmitting the verification inquiry to the selected verification service.

15. The computer-based method according to claim 11, wherein the second requesting domain is a subdomain of the first requesting domain.

16. The computer-based method according to claim 11, wherein transmitting a verification inquiry to a verification service comprises transmitting a DNS message, and transmitting a verification inquiry to a second verification service comprises transmitting an http message to a web-based verification site.

17. A computer-based method for verifying an application that is requesting a login credential, comprising:
receiving a login credential that includes an identification of an associated domain from a local instance of an application;
detecting a password request from the local instance of the application for a password associated with the login credential;
determining domain information corresponding to the application;
transmitting a verification inquiry to a verification service, the verification service being selected based on the associated domain, the verification inquiry including a domain identifier for the determined domain, the transmitting of the verification inquiry to the verification service being performed prior to transmitting the password associated with the login credential to the requesting domain;
receiving a response to the verification inquiry indicating a trust level for the application; and
transmitting the login credential to the domain corresponding to the application.

18. The computer-based method according to claim 17, wherein determining domain information corresponding to the application comprises a site the application was downloaded from.

19. The computer-based method according to claim 17, wherein transmitting the verification inquiry comprises transmitting an http based request to a network based verification site.

20. The computer-based method according to claim 17, wherein detecting a password request comprises detecting a field for entry of a character string corresponding to a password.

* * * * *